United States Patent
Hickman et al.

(10) Patent No.: US 6,508,852 B1
(45) Date of Patent: Jan. 21, 2003

(54) HONEYCOMB PARTICULATE FILTERS

(75) Inventors: David L. Hickman; Thomas D. Ketcham, both of Big Flats; David F. Thompson, Painted Post, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/687,211

(22) Filed: Oct. 13, 2000

(51) Int. Cl.$^7$ ................................................. B01D 39/20
(52) U.S. Cl. .................. 55/523; 55/385.3; 55/DIG. 10; 55/DIG. 30; 422/169; 422/171; 422/177; 422/180; 60/297; 502/66; 502/74
(58) Field of Search ........................ 55/523, DIG. 10, 55/DIG. 30, 385.3; 422/180, 177, 169, 171; 60/297; 502/66, 74

(56) References Cited

U.S. PATENT DOCUMENTS

| | | | |
|---|---|---|---|
| 4,390,355 A | * | 6/1983 | Hammond Jr. et al. ........ 55/523 |
| 4,416,675 A | * | 11/1983 | Montierth ..................... 55/523 |
| 4,416,676 A | | 11/1983 | Montierth |
| 4,857,089 A | * | 8/1989 | Kitagawa et al. .............. 55/523 |
| 4,960,449 A | * | 10/1990 | Yonushonis ................... 55/523 |
| 5,098,455 A | * | 3/1992 | Doty et al. .................... 55/523 |
| 5,114,581 A | * | 5/1992 | Goldsmith et al. ............ 55/523 |
| 5,183,608 A | | 2/1993 | Guile |
| 5,204,055 A | | 4/1993 | Sachs et al. |
| 5,223,318 A | * | 6/1993 | Faber et al. ................... 55/523 |
| 5,238,472 A | * | 8/1993 | Pfister et al. .................. 55/523 |
| 5,492,679 A | * | 2/1996 | Ament et al. .................. 55/523 |
| 5,641,332 A | | 6/1997 | Faber et al. |
| 5,782,941 A | * | 7/1998 | Matsunuma et al. .......... 55/523 |
| 5,940,674 A | | 8/1999 | Sachs et al. |

FOREIGN PATENT DOCUMENTS

| | | |
|---|---|---|
| WO | 94/22556 | 10/1994 |
| WO | 00/57040 | 9/2000 |

* cited by examiner

*Primary Examiner*—David A. Simmons
*Assistant Examiner*—Minh-Chau T. Pham
(74) *Attorney, Agent, or Firm*—Anca C. Gheorghiu

(57) ABSTRACT

A honeycomb structure for a diesel engine or an automotive engine where the wall thickness is varied in a controlled manner from the front surface to the back of the honeycomb. One example is grading the web thickness continuously from thin webs on the front of the DPF to thick webs on the back of the DPF. Another example is to make a two layer honeycomb with thinner walls and/or perhaps even lower cell density on the upstream side of the honeycomb. This provides a lower thermal mass front while retaining the thicker webs and higher thermal mass at the back of the honeycomb. The honeycomb structure has a thermal mass or heat capacity ranging from above $8.5 \times 10^{-3}$ cal/cubic cm-K to below 0.25 cal/cubic cm-K along an axis from the inlet end to the outlet end.

8 Claims, 3 Drawing Sheets

HONEYCOMB PARTICULATE FILTERS

BACKGROUND OF THE INVENTION

The present invention relates to structures for use in the filtration of exhaust streams, particularly for the capturing of particulate matter. Specifically the invention is a multicellular structure, particularly a honeycomb with differing wall thickness or differing heat capacity along the flow axis, especially suited for diesel particulate filters.

Standard commercially available filters are made of cordierite ($2MgO-2Al_2O_3-5SiO_2$). Cordierite has a low coefficient of thermal expansion (~5–8×10$^{-7}$/° C.), good thermal shock and a moderately high melting point (~1460° C.). These properties coupled with the low cost of the cordierite-forming raw materials (e.g., clay, talc, alumina, and silica) are what have made cordierite a desirable candidate for diesel particulate filters. However, in some applications such as diesel particulate filters (DPFs), which require regeneration of the trapped carbon soot, the combustion process may produce temperature spikes which may exceed the melting point of cordierite and can thermally shock and crack, or even melt the filter. Therefore a significant problem associated with conventional cordierite DPFs is susceptibility to damage during the required filter regeneration cycling.

A great deal of effort has been expended to try to find a material that has a higher use temperature than cordierite with equivalent thermal shock resistance. No material with the same ease of production, cost and properties, especially thermal expansion coefficient has yet to be found.

Recently silicon carbide has been proposed for use in DPFs. SiC has a significantly higher melting point (2750° C.) than cordierite. However disadvantages of SiC include excessive die wear and difficulties in sintering, all translating into high costs associated manufacture of DPFs, which have led to limited commercial use. Silicon carbide DPFs are made from approximately one inch square DPF type honeycomb segments cemented together with an inorganic cement containing inorganic fibers.

Other high temperature materials, such as NZP, have been proposed but excessive die wear, difficulties in sintering, phosphorous loss, etc. have led to very limited commercial use.

In the art it is known that increased thermal mass in the body of the part is desirable for DPFs made of materials that can melt at intermediate temperatures such as cordierite, while still providing adequate low back pressure and reasonable soot loading capacity. However, if the part is too massive, then regeneration is difficult to initiate, costing more energy input, usually fuel, to achieve regeneration light-off.

With most filter designs, the light off occurs on the front face of the DPF and the maximum temperatures occur on the back face of the part. Therefore, it would be advantageous, through filter design to minimize the energy cost of initiating the regeneration, while not promoting excessive temperature during regeneration on the down stream end of the filter.

SUMMARY OF THE INVENTION

In one embodiment the invention is a multicellular structure such as a honeycomb structure with differing wall thickness along the flow axis, particularly suited for diesel particulate filters (DPFs), however, it is also applicable to flow-through honeycombs. The honeycomb can be a single monolith or can be of a segmented DPF type. A preferred embodiment is a honeycomb, particularly for diesel engines or automobile engines, where the body has thinner walls on one end of the honeycomb and thicker walls on the other. For a DPF, the thinner walls on the front surface allows the DPF to initiate regeneration with less energy cost. For automotive honeycombs, a front with thinner walls (a lower mass front) allows earlier light-off. The honeycomb can be made of any suitable ceramic such as cordierite or silicon carbide.

The honeycomb structure has a heat capacity ranging from above $8.5 \times 10^{-3}$ cal/cubic cm-K to below 0.25 cal/cubic cm-K along an axis from the inlet end to the outlet end.

The invention is also using solid freeform manufacturing, particularly binder ink jet printing to produce this structure.

DETAILED DESCRIPTION OF THE INVENTION

Figure 1:
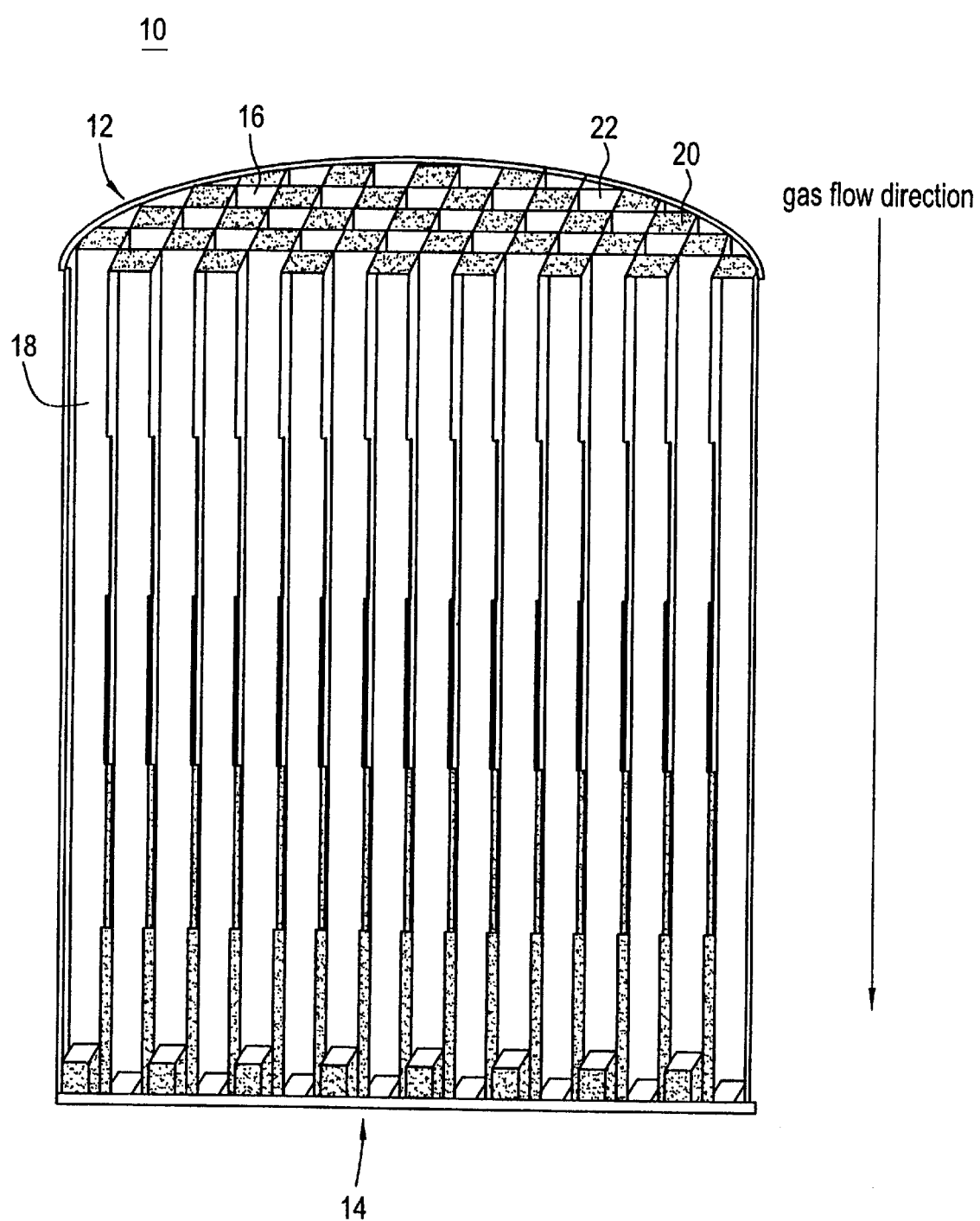
FIG. 1 shows a honeycomb with webs (walls) that continuously thicken along the gas flow direction.

The invention is a multicellular structure, particularly a honeycomb structure, which has an inlet end and an outlet end and a multiplicity of cells extending from the inlet end to the outlet end through which engine exhaust stream passes, the honeycomb structure having the wall thickness varied on controlled manner from the inlet end to the outlet end of the honeycomb. One example is grading the web thickness continuously from thin webs on the inlet end of the filter to thick webs on the outlet end of the filter. Another example is to make a two layer honeycomb with thinner walls and/or perhaps even lower cell density on the upstream side of the honeycomb. This provides a lower thermal mass at the front while retaining the thicker webs and higher thermal mass at the back of the honeycomb.

A suitable method of making the inventive structures is using solid freeform manufacturing, particularly binder ink jet printing to produce the inventive structures, as disclosed in U.S. Pat. No. 5,204,055, herein incorporated by reference in its entirety. Briefly, a thin powder layer is placed on a movable supporting bed. An ink jet type head or a row of ink jet heads is passed over the powder bed and computer control is used to deposit a liquid binder to selected areas in the powder bed. The supporting bed is indexed downward and a new layer of powder is applied to the bed. The process repeats itself and a structure is built up from the binder and powder. When the desired structure is obtained, the loose powder is removed from the structure. The structure may optionally be sintered to open or closed porosity.

Another suitable method is one that uses a mask and spray nozzles as described in U.S. Pat. No. 5,940,674, herein incorporated by reference in its entirety.

Yet another suitable method is using inorganic cement to "glue" or co-firing a low cell density and/or thin wall honeycomb on the upstream side of the DPF. Various ceramic cements have been used to make larger structures from smaller honeycomb pieces, usually to give a larger dimension normal to the axis of the honeycomb channels. A thinner walled honeycomb can simply be cemented to the front of another, thicker walled honeycomb while taking care not to plug the channels. It is preferred that the cement have a similar thermal expansion and a use temperature as high as the application the mated honeycomb will encounter. When mating two fired honeycomb pieces together, the cement should solidify or "cure" at a temperature below the melting point of the honeycombs.

A variation on this method is described in World Patent 94/22556 where a dried but not fired honeycomb is re-hydrated and reformed to make plugs for filters. Such can be used to bond thin to thick walled honeycombs. At least two honeycombs with differing wall thickness are separately extruded and dried. At least one end of two honeycombs is re-hydrated (softened if not using water as a solvent) and the re-hydrated ends pressed together, forming an intimate bond. The composite honeycomb is dried and then sintered. A thin and thick walled honeycomb results. The process could of course be multiplied to give a thin to thick walled honeycomb with a series of increasing wall thickness.

For diesel particulate filters of only two different wall thickness' or heat capacity regions, this cementing, re-hydration and pressing method is preferred.

Yet another suitable method is to use some type of erosion or abrasion method on the face of the honeycomb, such as a mild sand "blasting" on the fired or "green" structure, to thin the webs on the front surface. For a fired honeycomb, fine sand, significantly smaller than the channel size is utilized. Abrasive particles such as alumina and silicon carbide rather than silica will make this process faster. The abrasive is entrained in a fluid, particularly compressed air and directed at a rate high enough to thin the face of a honeycomb, but not erode it significantly. This process could also be used for honeycombs that were dried after extrusion but not yet sintered. In this case the fluid flow and pressure will not need to be as high and the particles may not need to be so numerous or abrasive.

FIG. 1 shows a honeycomb structure 10 particularly suited as a DPF. Honeycomb 10 has an inlet end 12 and an outlet end 14 and a multiplicity of cells or channels 16 extending from the inlet end 12 to the outlet end 14, the cells having porous walls 18, wherein part of the total number of cells at the inlet end 12 are plugged 20 along a portion of their lengths, and the remaining part of cells that are open 22 at the inlet end are plugged at the outlet end along a portion of their lengths, so that an engine exhaust stream passing through the cells of the honeycomb from the inlet end to the outlet end flows into the open cells, through the cell walls, and out of the structure through the open cells at the outlet end.

The walls 18 continuously thicken along the gas flow direction (as shown by the arrow), from the inlet end 12 to the outlet end 14, for lower energy input during regeneration.

Figure 2:
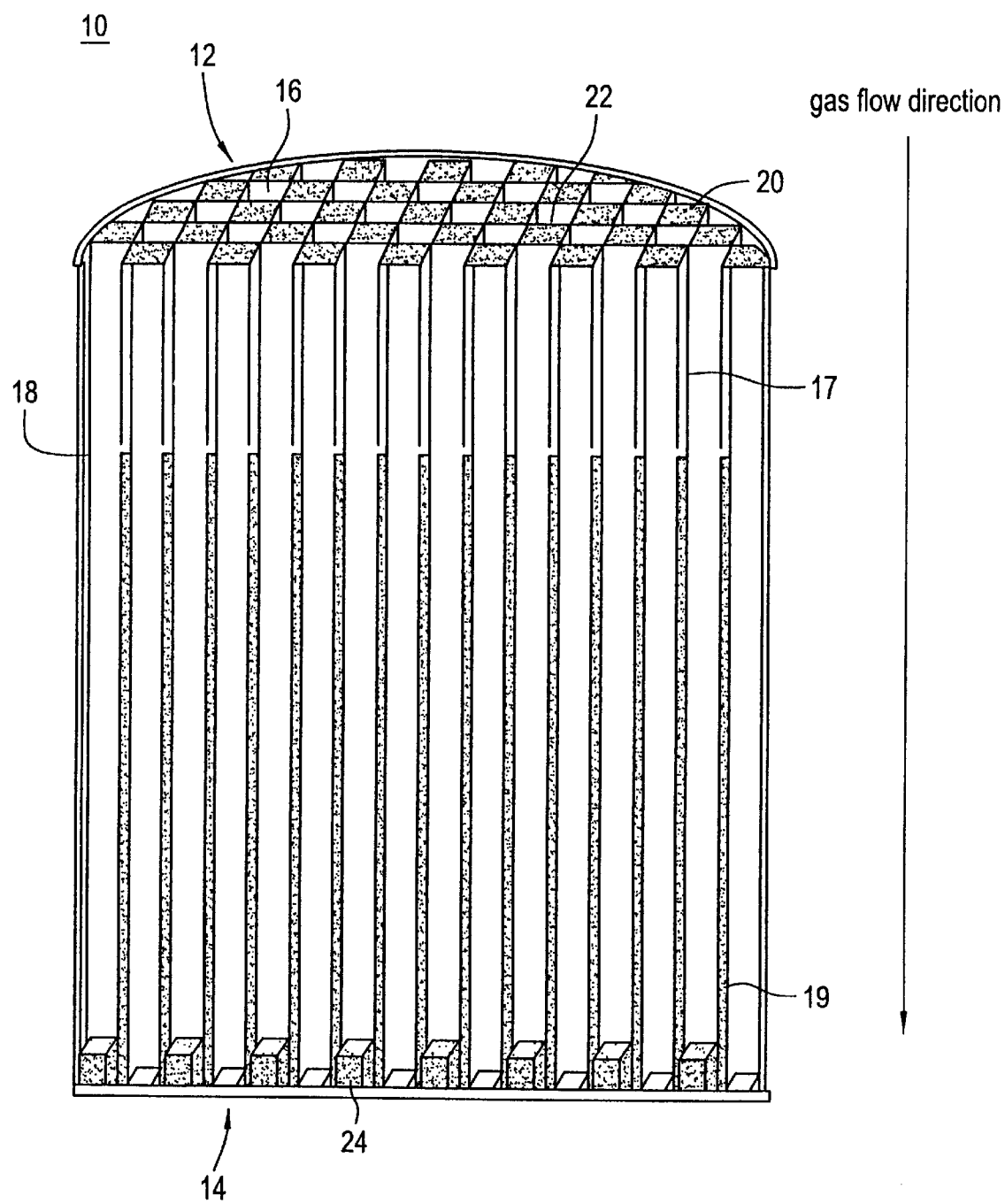
FIG. 2 shows a honeycomb with a low mass thin web (wall) front.

FIG. 2 shows honeycomb structure 10 particularly suited as a DPF, with two distinct wall thicknesses. Inlet end 12 has walls 17 which are thinner than walls 19 at the outlet end 14. This configuration results in a lower cell density on the upstream side of the honeycomb at the inlet end.

For both embodiments plugs 20 are thinner than plugs 24. This plugging concept supports a filter design with a low mass thin wall front or inlet end and a higher thermal mass back or outlet end.

It is desirable to have the thin plugs 20, much thinner than the current 2 mm to 5 mm or greater plug depth are desirable, preferably about 0.3 to 1.5 mm. When using solid freeform manufacturing, tapered end plugs with thin walls can be made with the taper being from one wall over to the opposite wall, from two opposite walls, from three walls to one vertical or from all four walls to the center.

A filter design with a lower thermal mass front enables easy, low fuel penalty, light-off regeneration and yet have enough thermal mass in the back of the part to prevent melting. To some extent, the soot deposition will not be completely uniform. The inlet end or the front of the honeycomb with the thinner walls will at least initially gather more soot due to the lower pressure drop. As the soot layer builds up, it creates its own back pressure. As a result, the deposition rate across the entire DPF becomes more uniform. This may result in a soot layer that is somewhat thicker in the front of the part. This should have the effect of after ignition of regeneration, increasing energy deposition and hence the temperature at the inlet or front of the part while (in a relative sense) decreasing the energy deposition and thus decreasing the maximum temperature at the outlet or back of the filter.

Figure 3:
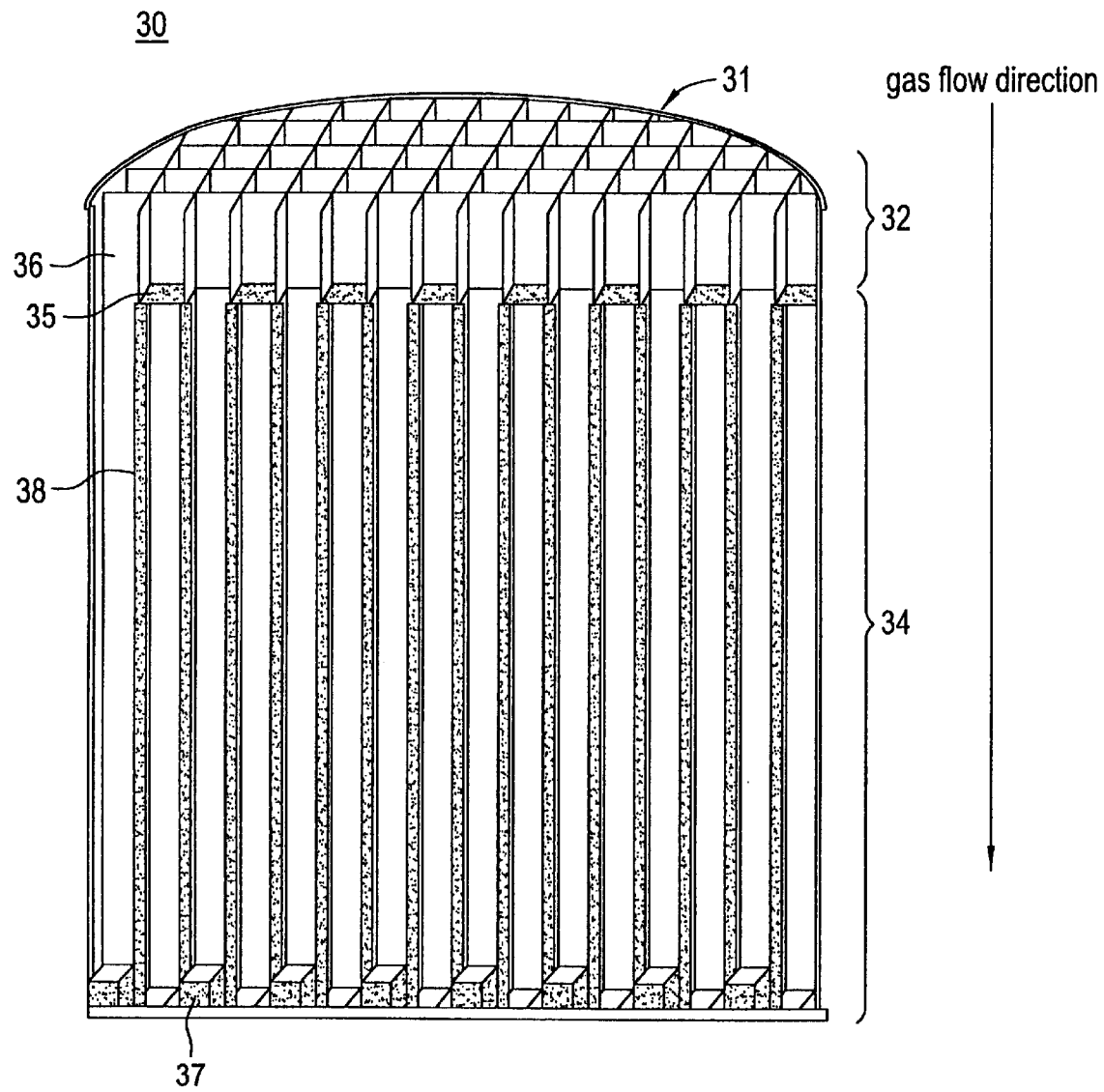
FIG. 3 shows a low thermal mass thin wall honeycombs, non-DPF, front of thicker wall DPF.

FIG. 3 shows a honeycomb structure 30 particularly suitable as a DPF. Honeycomb 30 has two sections 32 and 34. First section 32 is a thin and/or low cell density honeycomb that is not plugged, i.e., a low mass, thin wall, non-plugged honeycomb. Second section 34 is a plugged honeycomb. Section 32 has walls 36 which are thinner than walls 38 of section 34 again achieving a design with a lower thermal mass at the front or inlet end 31, and a higher thermal mass at the back or outlet end 33. Some soot will deposit on the honeycomb, although it is not part of the flow through wall. Section 34 contains plugs 35 which are thinner than plugs 37, as described herein above.

Although the figures presented are directed to diesel particulate filters, it is to be understood that the present invention is also applicable to other type of filtering devices such as automotive catalytic substrates or flow-through monoliths.

The thickness of the thin and thick walls may vary widely. Often the only practical limitations are the ability to manufacture the structure. For automotive catalytic substrates, walls in the 2 mil or 50 micron thickness range have been achieved. One mil or 25 micron wall thickness appear to be achievable, as there is no fundamental scientific limit to the wall thickness in this size range. Preferably, the thin walls have a thickness above 20 microns. More preferably, the wall thickness is above 45 microns. For the thicker walls in diesel particulate filters, the thickness should be above 300 microns. Preferably, the thickness is above 400 microns. More preferably, the thickness is above 500 microns.

Instead of varying the wall thickness continuously, in another embodiment a honeycomb can be made that has multiple alternating thick and thin portions. To some extent, more soot will accumulate on the thinner areas and less on the thicker areas. This could allow a high soot loading, but as it regenerates, the thicker portions of the web will keep the maximum temperature under control. To some extent, this will allow for a more uniform soot loading over the entire filter than the thin to thick continuous wall thickness gradation.

The filter element generally is made of a ceramic material having a low thermal expansion coefficient, high thermal shock and relatively high melting point, such as cordierite. For a diesel particulate filter, the monolithic filter element has a honeycomb structure consisting of a plurality of parallel channels. The channels are divided into alternating inlet channels and exit channels. The inlet channels are open at an inlet end of the filter element and plugged at the exit end. Conversely, exit channels are plugged at the inlet end and open at the exit end. Therefore, each cell is plugged only at one end. The preferred arrangement is to have every other cell on a given face plugged as in a checker board pattern. The inlet and exit channels are separated by thin porous longitudinal side walls which permit the exhaust gases to pass from the inlet channels to the exit channels along their length. This plugging configuration allows for more intimate contact between the exhaust stream and the porous wall of the substrate. The exhaust stream flows into the substrate through the open cells at the inlet end, then through the porous cell walls, and out of the structure through the open cells at the outlet end. Filters of the type herein described are known as a "wall flow" filters since the flow paths resulting from alternate channel plugging require the exhaust being treated to flow through the porous ceramic cell walls prior to exiting the filter. Generally honeycomb cell densities range from about 93 cells/cm$^2$ (600 cells/in$^2$) to about 4 cells/cm$^2$ (25 cells/in$^2$).

In a preferred embodiment for a diesel particulate filter, the inlet and exit channels have a substantially rectangular cross-sectional shape. Preferably, the rectangular inlet and exit channels are approximately eight to twelve inches long and 0.083 inches wide. However, the length of the inlet and exit channels may range from 2 to 24 inches and their widths vary from 0.05 to 0.15 inches. The honeycomb monolithic element provides a very large filtration surface area per unit volume significantly reducing the size of the particulate filter.

In a preferred embodiment for an automotive catalyst substrate, the inlet and exit channels have a substantially rectangular cross-sectional shape. Preferably, the rectangular inlet and exit channels are approximately four to twelve inches long and 0.033 inches wide. However, the length of the inlet and exit channels may range from 2 to 24 inches and their widths vary from 0.0058 to 0.15 inches. The honeycomb monolithic element provides a very large geometric surface area per unit volume with very low back-pressure.

It is preferred to have a honeycomb with a thermal mass or heat capacity above $8.5 \times 10^{-3}$ cal/cubic cm-K at the front or inlet end of the honeycomb. It is preferred to have a honeycomb with a heat capacity below 0.25 cal/cubic cm-K at the back or outlet end of the honeycomb. It is more preferred to have a honeycomb with a varying heat capacity ranging between $8.5 \times 10^{-3}$ and 0.25 cal/cubic cm-K upstream in the direction of the exhaust stream flow from the inlet end to the outlet end.

In another embodiment the a low cell density at the front may be achieved by removing some of the walls from the face of honeycomb through careful machining. This might be done before firing or after firing the honeycomb. One face of the honeycomb could have every fourth wall intersection removed, along with as much of the four adjoining walls as possible without damaging the outer periphery walls. This is accomplished with a fine drill/milling tool and such tools can be ganged for multiple intersection/web removal in one machine motion. The intersections and web walls are removed to a depth of about 1 mm to 1 cm. Instead of drills/milling tools, vibratory/ultrasonic probes could also accomplish the material removal and might have advantages in multiple wall intersections being removed in one machine motion. For the automotive catalytic substrate this machining method, with drills/milling tools or vibrating probes is the preferred method.

While this invention is shown as applied to a square cell honeycomb with a square grid, it is to be understood, that the present invention could also apply to other honeycomb patterns.

In order to more fully illustrate the present invention, the following non-limiting examples are supplied.

EXAMPLE 1

A prophetic example of forming a silicon carbide DPF with solid free form manufacturing utilizing a laser driven polymerization according to the present invention is provided as follows. A bath of a silicon carbide slurry at less than about 60% by volume solids is placed in a slowly circulating bath, where there is a bed or support about 200 microns under the surface of the slurry. A laser under computer control polymerizes fine lines in the slurry and the "hardened" polymer+silicon carbide powder rests on the support. The support is lowered by 200 microns while the slurry height remains unchanged and the process is repeated. The front of the filter has walls about 8 mills or 200 microns thick while the walls in the back of the filter are about 20 mils or 500 microns thick. The cells have a square cross-section and have a center to center distance of about 1.8 mm. The front cells have a tapered plug that comes to a point like a four sided pyramid. The walls thicken toward the back in a step-wise continuous manner, the size of the steps determined by the finest spacing the laser is capable of generating in the polymerization. The back of the filter has thick plugs of over 5 mm length. The structure is segmented to reduce thermal shock damage. When the hardened powder+polymer filter structure is finished the slurry is poured out of the structure. After additional drying and hardening of the structure, out of the slurry bath, the structure is placed in a furnace and the binder burnt out in the presence of some oxygen at low temperatures, 200–600° C. then fired in an inert atmosphere at elevated temperatures, 1500–2300° C. The resulting filter is expected to have a porosity of about 40–60%.

EXAMPLE 2

A prophetic example of forming a cordierite automotive catalyst substrate according to the present invention is provided as follows.

A 900 cells per square inch (cpsi), 2.7 mil wall, square cell honeycomb is extruded using batch materials that react upon sintering to form cordierite and methocel as a binder, along with water and perhaps oils and waxes. A honeycomb with a 900 cells per square inch, 1 mil wall is also made. The extruded articles are cut and dried. Prior to sintering, one face of the 2.7 mil wall honeycomb is re-hydrated to soften it, along with one face of the 1 mil wall thickness honeycomb. The two re-hydrated faces are pressed together, with enough pressure to form a good bond but not with so much pressure as to collapse the honeycombs. If alignment of the walls of both honeycombs is possible, it is preferred to lower back pressure. The honeycomb is dried and then sintered as usual with the reduced mass, lower wall thickness face being oriented upwards. It is expected that there results a honeycomb with a lower mass front. It is expected that the low mass front has a decreased thermal mass, lower than 20% the thermal mass of the base honeycomb.

EXAMPLE 3

A prophetic example of forming a silicon carbide DPF according to the present invention is provided as follows. Two silicon carbide honeycombs are made by extrusion. One is a 200 cells per square inch, 18 mil, 450 micron thick wall, honeycomb and one is an 8 mil wall 200 cells per square inch honeycomb. After drying the 18 mil wall honeycomb is plugged as a DPF in a checker board pattern using a silicon carbide formulation similar to but with lower viscosity than the extrusion batch. The face intended for the inlet side of the DPF can have thinner plugs. When the plugs have dried the inlet face of the unfired DPF is re-hydrated and one face of a slice of the 8 mill wall honeycomb is also re-hydrated.

The two re-hydrated faces are pressed together, with enough pressure to form a good bond but not with so much pressure as to collapse the honeycombs. If alignment of the walls of both honeycombs is possible, it is preferred. The honeycomb is dried and then sintered as usual with the reduced mass, lower wall thickness face being oriented upwards. It is placed in a furnace and the binder burnt out in the presence of some oxygen at low temperatures, 200–600° C., then fired in an inert atmosphere at elevated temperatures, 1500–2300° C.

It is expected that the resulting filter has a porosity of about 40–60% in the 18 mil wall DPF section. This results in a honeycomb with a lower mass front than the thermal mass of the DPF section. It can heat to the soot light off temperature faster than the higher thermal mass DPF body that results in a lower fuel penalty for controlled regeneration.

EXAMPLE 4

A prophetic example of forming an automotive catalyst substrate according to the present invention is provided as follows.

A 600 cpsi, 4 mil wall, square cell honeycomb intended for an automotive catalyst substrate is extruded using batch materials that react upon sintering to form cordierite with methocel as a binder, along with water and perhaps oils and waxes. The extruded article is cut and dried. Prior to sintering, one face of the honeycomb has every fourth wall intersection removed along with as much of the four adjoining walls as possible without damaging the outer periphery. This is accomplished with a fine drill/milling tool and such tool can be ganged for multiple intersection/web removal in one machine motion. The intersections an web walls are removed to a depth of about 1 mm to 1 cm. Instead of drills/milling tools, vibratory/ultrasonic probes could also accomplish the material removal and might have advantages in multiple wall intersections being removed in one machine motion. The honeycomb is sintered as usual with the reduced mass, lower cell density face being oriented upwards. This results in a honeycomb with a lower mass front of perhaps as low as ½ the thermal mass of the base honeycomb.

In addition to these embodiments, persons skilled in the art can see that numerous modifications and changes may be made to the above invention without departing from the intended spirit and scope thereof.

It is claimed:

1. A honeycomb structure for use with diesel engines, the honeycomb structure comprising an inlet end, an outlet end, and a plurality of cells extending along an axis from the inlet end to the outlet end, wherein the honeycomb structure further includes a first section and a second section, the first section extending from the inlet end a distance along the axis, the second section extending in continuation from the first section along the axis to the outlet end, the cell in the second section having thicker walls than the cells in the first section, the walls of the cells in both sections being of uniform thickness therethrough, wherein a portion of the cells on the inlet end and a portion of the cells on the outlet end are plugged, the plugged portion of the cells at the inlet end being different from the plugged portion of the cells at the outlet end, such that exhaust gases enter the honeycomb structure body through open cells at the inlet end, flow through porous walls, and exit the honeycomb structure through open cells at the outlet end, wherein the plugs in the cells at the outlet end are thicker than the plugs in the cells at the inlet end.

2. The honeycomb structure of claim 1 wherein the inlet end has a low mass, thin wall front.

3. The honeycomb structure of claim 1 wherein the plugs at the cells at the inlet end are displaced a distance within the honeycomb structure body along the axis, such that the inlet end has a low mass, thin wall, non-plugged front.

4. The honeycomb structure of claim 1 wherein the thinner portion of the walls have a thickness greater than 20 microns.

5. The honeycomb structure of claim 4, wherein the thinner portion of the walls have a thickness greater than 45 microns.

6. The honeycomb structure of claim 1 wherein the thicker portion of the walls have a thickness greater than 300 microns.

7. The honeycomb structure of claim 6, wherein the thicker portion of the walls have a thickness greater than 400 microns.

8. The honeycomb structure of claim 1 wherein the honeycomb structure has a heat capacity ranging from above $8.5 \times 10^{-3}$ cal/cubic cm-K to below 0.25 cal/cubic cm-K along an axis from the inlet end to the outlet end.

* * * * *